April 29, 1969 R. HOLZMAN ET AL 3,441,717

SYNCHRONIZATION SYSTEM

Filed Feb. 18, 1966 Sheet 1 of 7

Weingarten, Orenbuch & Lahive
Attorneys

Weingarten, Orenbuch & Lahive
Attorneys

Weingarten, Orenbuch & Lahive
Attorneys

Weingarten, Oranbach & Lahive
Attorneys

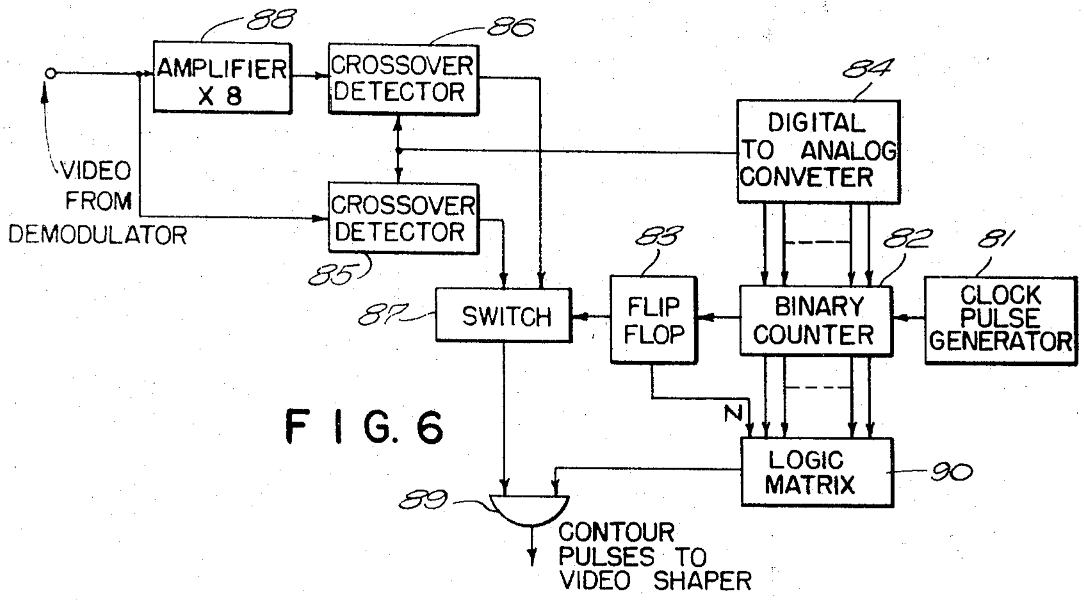
FIG. 6
| CONTOUR | LOGARITHMIC | | | | | | | |
|---|---|---|---|---|---|---|---|---|
| | DECIMAL | BINARY | | | | | | N |
| | | $2^5$ | $2^4$ | $2^3$ | $2^2$ | $2^1$ | $2^0$ | |
| 1 | 8 | 0 | 0 | 1 | 0 | 0 | 0 | 0 |
| 2 | 15 | 0 | 0 | 1 | 1 | 1 | 1 | 0 |
| 3 | 30 | 0 | 1 | 1 | 1 | 1 | 0 | 0 |
| 4 | 8 | 0 | 0 | 1 | 0 | 0 | 0 | 1 |
| 5 | 15 | 0 | 0 | 1 | 1 | 1 | 1 | 1 |
| 6 | 30 | 0 | 1 | 1 | 1 | 1 | 0 | 1 |
| 7 | 63 | 1 | 1 | 1 | 1 | 1 | 1 | 1 |
FIG. 8
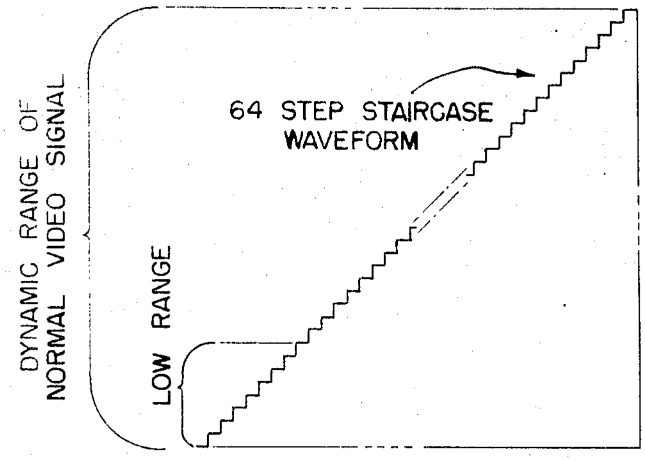
FIG. 7
Weingarten, Orenbuch & Lahive
Attorneys Weingarten, Orenbuch & Lahive
Attorneys

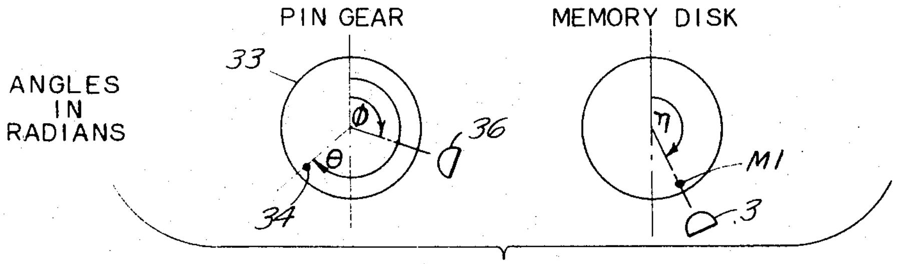

FIG. 13

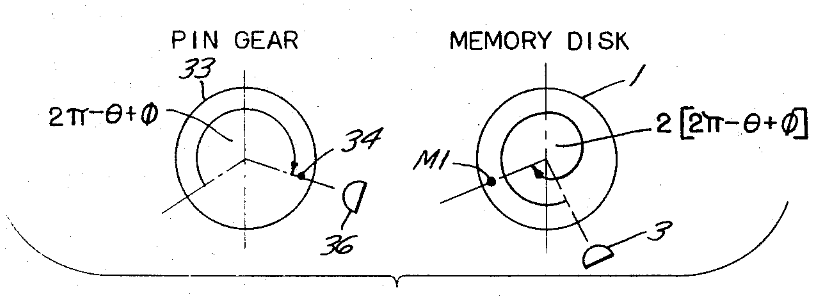

FIG. 14

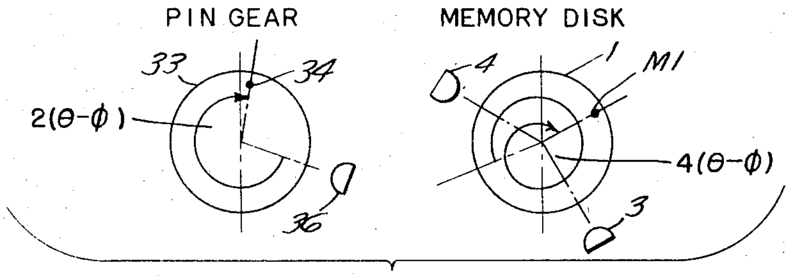

FIG. 15

| TIMING | POSITION OF PIN | POSITION OF END OF MESSAGE | NUMBER OF PULSES IN COUNTER |
|---|---|---|---|
| START OF PLAYBACK | $\theta$ | $\eta$ | 0 |
| PHOTOCELL PULSE | $\phi$ | $\eta+2[2\pi-\theta+\phi]$ | $2[2\pi-\theta+\phi]\frac{5000}{2\pi}$ |
| SYNCHRONIZATION COMPLETE | $\phi+2(\theta-\phi)$ OR $2\theta-\phi$ | $\eta\ \ 2[2\pi-\theta+\phi]+4(\theta-\phi)$ OR $4\pi+\eta+2\theta-2\phi$ | 10,000<br>10,000 |

FIG. 16

Weingarten, Orenbuch & Fahive
Attorneys

United States Patent Office 3,441,717
Patented Apr. 29, 1969

3,441,717
SYNCHRONIZATION SYSTEM

Richard Holzman, Framingham, and Kenton J. Ide, Lincoln, Mass., assignors, by mesne assignments, to Signatection, Inc., Waltham, Mass., a corporation of Massachusetts Filed Feb. 18, 1966, Ser. No. 528,450
Int. Cl. G06c *29/00*
U.S. Cl. 235—92 4 Claims This invention relates in general to the analysis of complex waves. More particularly, the invention pertains to improved apparatus for depicting complex waves in a manner showing the variation in time of the distribution of the energy in the complex waves over a selected portion of the frequency spectrum.

In analyzing complex waves of the type produced by music, speech, and other sounds, it has been conventional to transform the complex waves into a spectrograph in which amplitude variations of the frequency components are represented by variations in the shade of the spectrographic pattern. That is, it is known that complex waves can be analyzed by using those waves to produce a visual pattern of tones or shades upon a surface on which frequency is plotted along one axis and time is plotted along another axis. The variation with time of the amplitude at the various frequencies is conveyed by the shades of the pattern, much as elevations in a topographical map of a geographical area are conveyed by color hues. Apparatus for representing complex waves as a pattern of shade is disclosed in U.S. Patent No. 2,403,997.

Another method of visually representing complex waves is disclosed in U.S. Patent No. 2,425,003. Rather than employing gradations in shade to convey variations in wave amplitude at various frequencies, contour lines are used to mark discrete amplitude levels. Contour lines are useful in that they permit more accurate quantitative determination of the wave energy distribution. The contour lines form a pattern of zones and the amplitude represented by any point in a zone is somewhere between the amplitude levels of the contour lines bounding that zone. A contour line pattern can, however, be confusing because valleys and peaks tend to look alike. That is, care must be exercised to determine whether the contour lines mark rises or falls in amplitude as all zones are of the same shade or color.

The principal objective of the invention is to provide improved apparatus for analyzing complex waves and for presenting the analysis in the form of a chart showing the time variation in the distribution of the wave energy over a selected portion of the frequency spectrum. In accordance with the invention, the variation with time of the amplitude of the frequency components is conveyed by gradations in tone of the pattern and contour lines are employed on the chart to mark discrete amplitude levels.

In the invention, the chart is generated upon a drum that is repetitively encircled by a rotating stylus. The drum is translated slowly upon its axis, causing the stylus to trace a tightly coiled helical path upon the chart. The stylus, during the generation of the chart, rotates in synchronism with a memory disk upon which the message to be analyzed has been recorded. A portion of the recording track of the memory disk remains unused and the chart has a seam which is not written upon. A synchronization system is employed in the invention to insure that the stylus passes over the seam at the time that the blank portion of the recording track is being scanned by a playback head.

Additional improvements in the invention reside in the manner of determining the discrete amplitude levels of the contour lines and in the manner of digitizing the video signal to obtain a scale expansion for low level video signals. The discrete amplitude levels are determined by a logic switching matrix which receives its input from a binary counter. The logic matrix is arranged to emit a signal whenever the output of the binary counter attains a count corresponding to a contour line amplitude level. A digital to analog converter responds to signals from the counter by generating a staircase waveform whose steps are the voltage equivalents of the counts in the counter. The video signal is compared with the staircase waveform in a detector which emits a pulse when the amplitude of the staircase waveform reaches the amplitude of the video signal. Where the occurrence of that pulse coincides with a signal from the logic matrix, the stylus is energized to mark a contour upon the chart. In effect the video signal is repetitively compared with a staircase waveform and a contour is printed whenever the comparison indicates the video amplitude is at one of the contour levels.

Scale expansion for low level signals is accomplished by amplifying the video to obtain a signal whose strength is increased by a precise factor. The staircase waveform is compared with the amplified video signal in a separate detector that emits a pulse when the signals are of equal amplitude. A switching arrangement is employed which alternately permits signals from the "normal" detector and the "scale expansion" detector to be passed to a device which determines whether there is coincidence with a signal from the logic matrix. In effect, the video signal is digitized alternately on the normal scale and the expanded scale. The expanded scale provides better accuracy of quantization for low level signals.

The arrangement of the invention, its construction, and its modes of operation can be more fully understood from the following exposition, when considered in conjunction with the accompanying drawings in which:

FIG. 1 schematically depicts the arrangement of the invention;

FIG. 6 illustrates the scheme for quantizing the video signal and producing contour pulses at discrete amplitude levels;

FIG. 7 shows the staircase waveform generated by the digital to analog converter of FIG. 6;

Figures 2, 3, 10, 11:
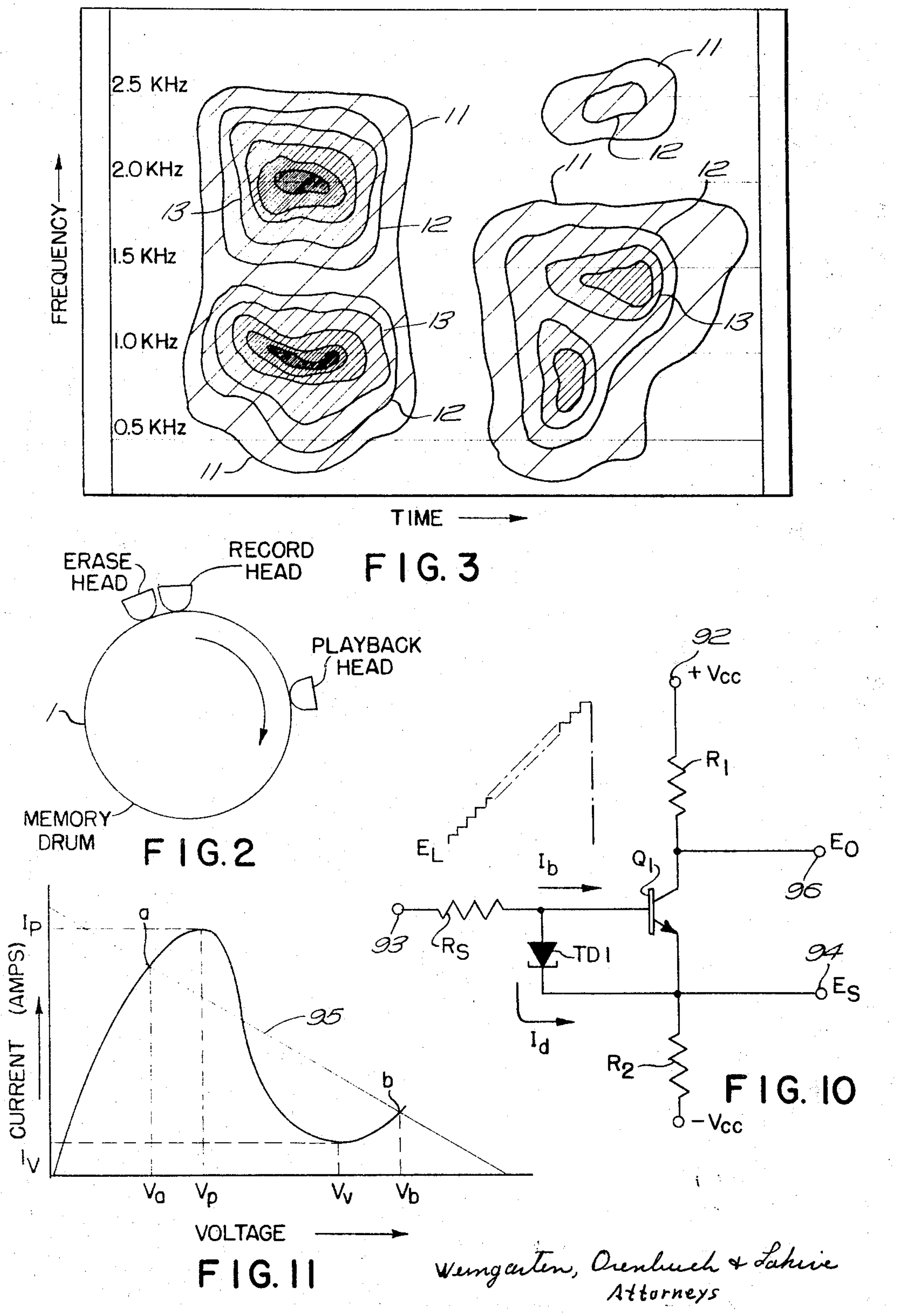
FIG. 2 shows the arrangement of magnetic heads around the periphery of the memory disk.
FIG. 3 shows the type of spectrum analysis chart produced by the invention.
Figure 12:
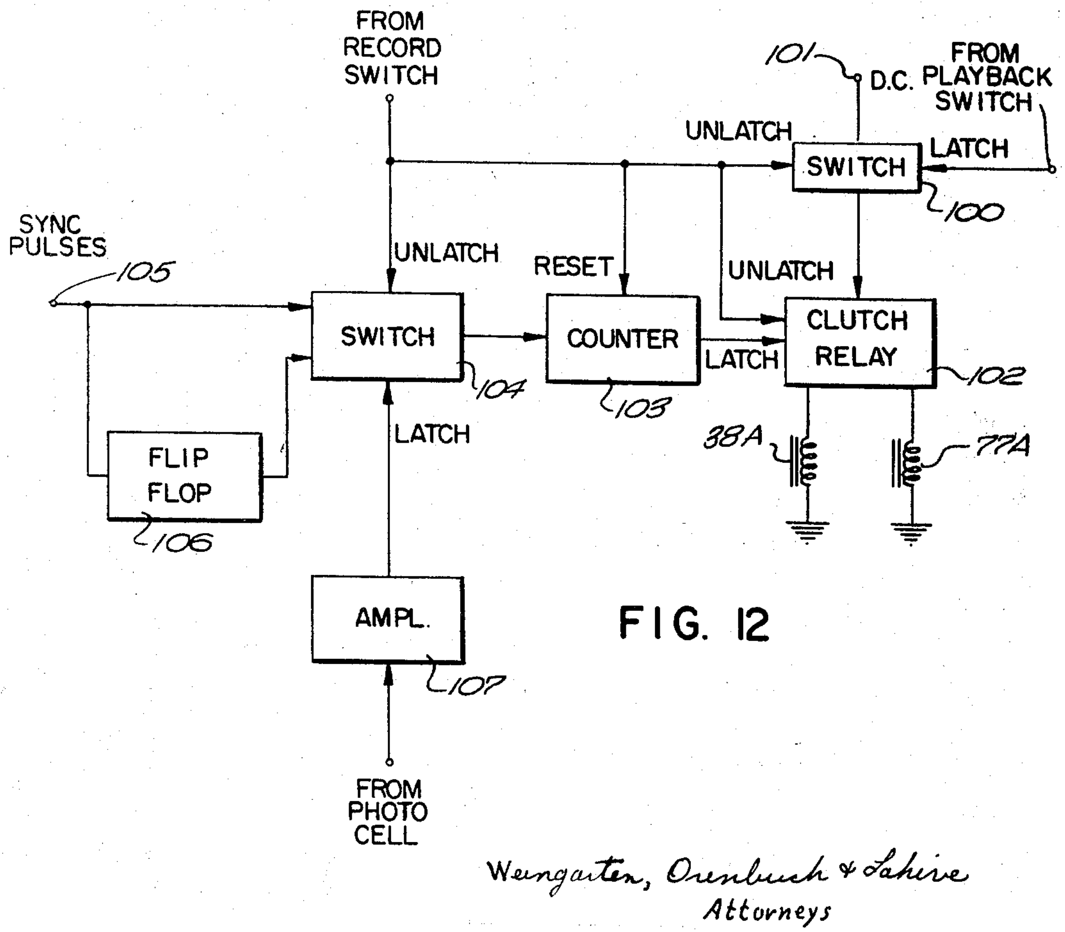

FIG. 8 tabulates contour levels relative to the count in the counter of FIG. 6 and the N signal from the flip-flop;

FIGS. 9A to 9D illustrate linear and logarithmically related contour levels and the sequence of pulses that are produced by the contour generator;

FIG. 10 is a schematic diagram of a crossover detector that may be employed in the invention;

FIG. 11 illustrates the negative resistance characteristic curve of a tunnel diode;

FIG. 12 depicts the arrangement of the controls in the synchronization system;

FIGS. 13, 14, and 15 show the relative positions of the two rotating members while synchronization is being obtained; and FIG. 16 tabulates the operation of the synchronization system.

Figure 1:
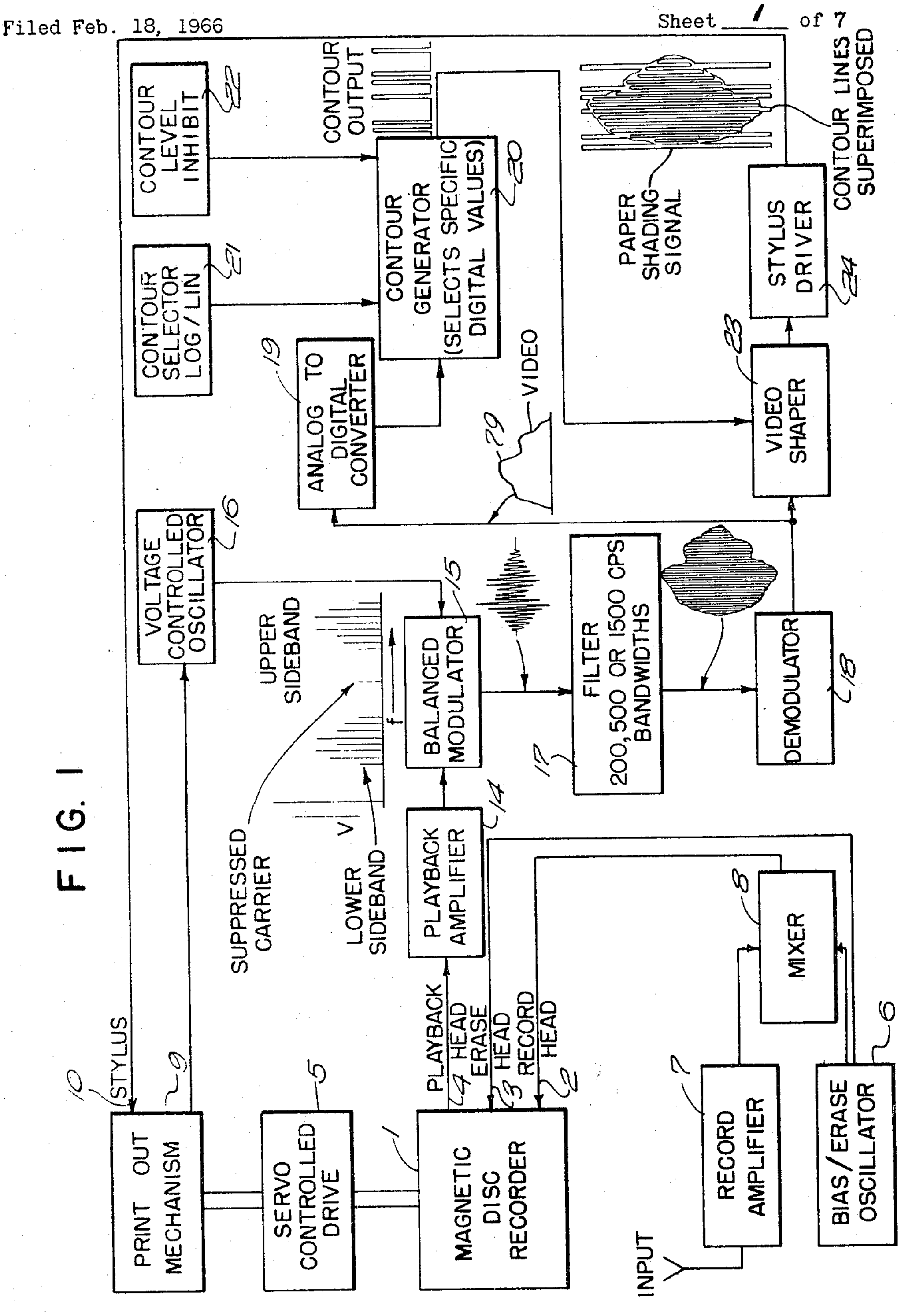

The scheme of the invention is depicted in FIG. 1. The message to be analyzed is, for the purpose of this exposition, assumed to be a train of complex waves having frequency components in the part of the spectrum extending from 50 cycles per second to 20 kilocycles per second. The message is recorded as magnetic signals upon a disk 1 which acts as the memory for the system. As shown in FIG. 2, three transducers or heads are arranged around the periphery of the memory disk 1. The memory disk rotates in the direction indicated by the arrow in FIG. 2. Record head 2 is employed to place the message, as magnetic signals, around the periphery of the memory disk. To insure that the recording track is cleared of signals before a new message is placed on the track by the record head, an erase head 3 is energized during the recordation of the message. From the direction of rotation of the memory disk (FIG. 2), it is apparent that the erase head is positioned to erase the track, shortly before the erased track passes to the record head. The separation between the erase head the record head is of interest because that separation makes a portion of the track unusable as a memory store. A playback head 4 is utilized to "read" the message recorded upon the memory disk. The functions of the playback head and the record head can be accomplished by a single transducer, but it is preferred to use separate mechanisms.

The magnetic memory disk 1, as depicted in FIG. 1, is rotated by a servo controlled drive mechanism 5 at a constant speed while the message is recorded upon the disk. The speed at which the disk turns during recording can be set to accommodate messages of different length. That is, a message whose duration is 1, 2, or 4 seconds can, for example, be recorded upon the periphery of the disk by setting the speed of rotation so that the entire message is recorded during one revolution of the disk. While recording, the erase head is energized by an A.C. signal from oscillator 6 to remove signals from the track on the memory disk. Oscillator 6, as is customary in high fidelity magnetic recording, also supplies an A.C. bias signal for the recording head. The A.C. bias signal is preferably of the same frequency as the A.C. signal supplied to the erase head and is at least several times higher than the frequency of the input signal current. The input signal, which may itself be obtained from a recording, is, when necessary, increased in strength by an amplifier 7. The amplified signal is combined with the bias signal in a mixer 8 whose output is applied to the record head. The level of the input signal is adjusted to insure that the signal is recorded with fidelity upon the memory disk.

Upon spectral analysis of the message recorded on the memory disk 1, there is produced by the print-out mechanism 9 a type of display that is similar to a topographic map. The X and Y coordinates of the spectral analysis "map" are, respectively, time and frequency and the amplitude, which is analogous to topographical altitude, is represented by a set of contour lines. Each contour line is a closed loop and represents a discrete amplitude level. The contour lines may be used to represent linearly or logarithmically related amplitude levels. In addition to the contour lines, the spectral analysis "map" has gradations of tone to indicate amplitude in a qualitative manner. That is, amplitude is more accurately represented by the contour lines than by the gradation in tone of the "map." The gradations of tone show whether the amplitude is rising or falling while the contour lines mark discrete levels of amplitude. The spectrum analysis "map" is made upon electrosensitive paper that is wrapped around a drum in the print-out mechanism 9. The drum does not rotate during generation of the "map" and the display can be observed as it is generated by a stylus 10 that rotates around the drum. The drum is, however, shifted while the display is generated so that the path traced by the stylus upon the paper is a tightly coiled helix. The availability to view of the display as it is generated is a convenience feature of some importance as it permits the operator to evaluate the adequacy of the presentation without waiting until the "map" is completed. A rudimentary "map" of the type produced by the print out mechanism is shown in FIG. 3. Time is indicated along the horizontal dimension and frequency is indicated along the vertical dimension. Frequency markers are produced upon the "map" by the print out mechanism. Those markers may be spaced every 500 cycles, for example, and each marker extends across the chart. The sets of contour lines are formed by closed loops and each contour line marks a specific amplitude level of the frequency components. In a set where contour line 11 represents the first amplitude, the second level is represented by the next contour line 12, the third amplitude level is represented by the immediately adjacent contour line 13, and so on. The zones between the contour lines are shaded and thereby indicate whether the amplitude is increasing or decreasing. Taking the normal shade of the electrosensitive paper as the datum, and assuming that the datum represents zero amplitude, then the zones between the contour lines become increasingly darker in shade as the amplitude rises and, as a corollary, become increasingly lighter in shade as the amplitude falls. To obtain an accurate estimate of amplitude at any point on the chart, the number of contour lines that must be crossed, proceeding from the datum into increasingly darker zones, are counted to determine the amplitude level of the contour line closest to that point. As amplitude is related to power, the power content in the frequency components of the analyzed complex waves is, in effect, displayed upon the chart in a manner depicting the variation in time of that power and its distribution among the frequency components.

Figure 4:
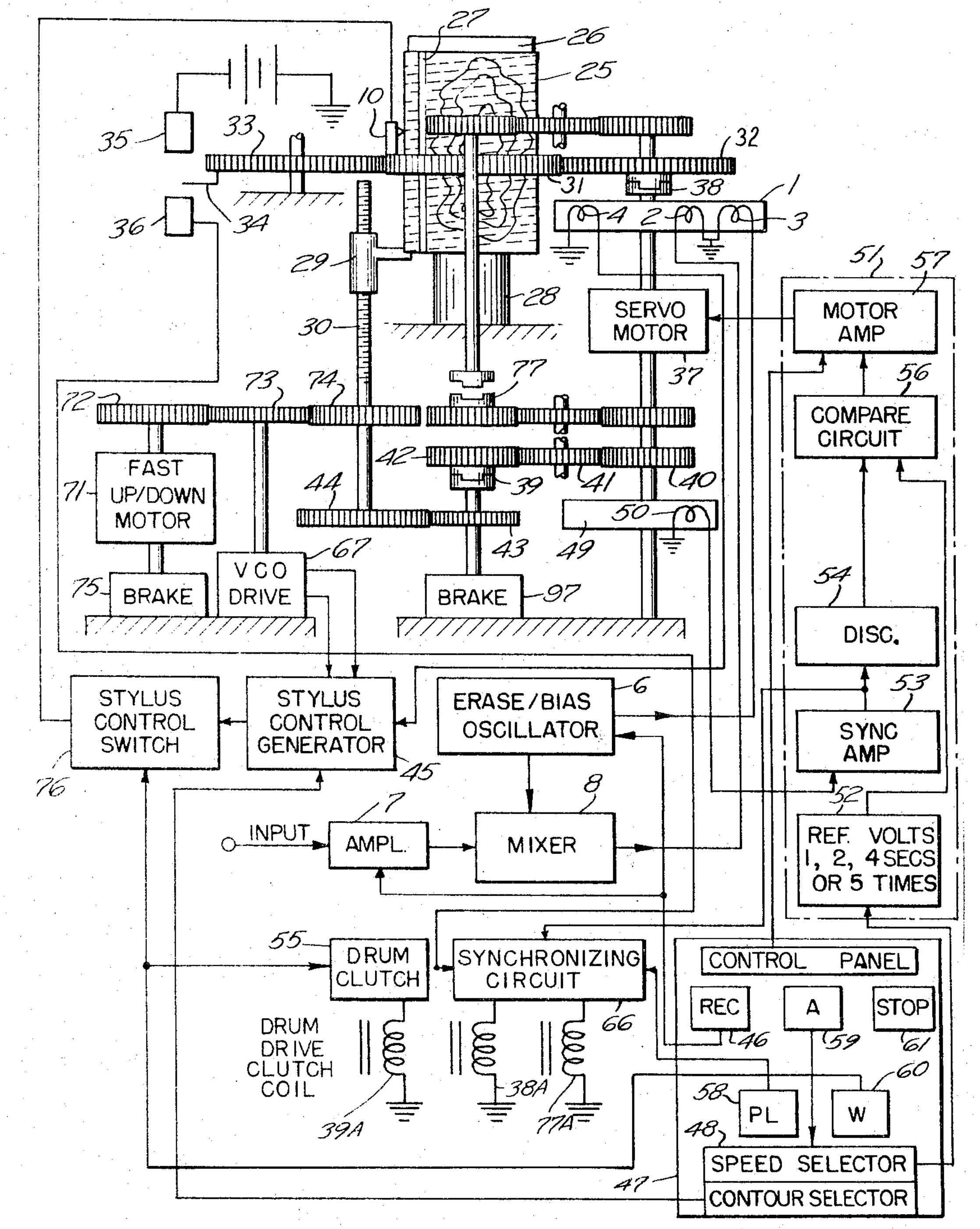
FIG. 4 illustrates the memory disk and the print out mechanism and the controls associated with those mechanisms.

The electrosensitive paper 25, indicated in FIG. 4, is wrapped around the drum 26 in the print out mechanism in a manner which forms a seam 27. As it is not desired to write over the seam, the stylus, during the generation of the spectrum analysis chart is made to pass over the seam while the unusable part of the recording track on the memory disk is scanned by the playback head. The seam, therefore, defines the left and right borders of the chart. Before generating the spectrum analysis chart, the position of the stylus with respect to the seam is made to correspond with the position of the end of the recorded message with respect to the playback head to insure that the stylus will pass over the seam at the time the blank portion of the recording track is scanned by the playback head. After the position of the stylus is brought into the desired correspondence with the recorded message, the stylus and memory disk are driven in synchronism by the servo controlled driver 5 to cause the stylus to circle the drum once for each complete revolution of the memory disk.

When it is desired to have the machine "write" the spectrum analysis chart, the speed of the memory disk is increased to cause the disk to turn five times faster than it turned when the message was recorded. As the stylus during the "write" operation is driven in synchronism with the memory disk, the speed of the stylus is also increased correspondingly. By increasing the speed of the memory disk, the signal frequencies recorded upon that disk are translated upward in frequency by a factor equivalent to the increase in speed. Thus, a signal recorded as having 50 cycles per second becomes, upon a fivefold increase in rotation of the memory disk, a 250 cycle per second signal; similarly, a signal recorded at 20 kc. is translated upwardly to 100 kc. The signals obtained from the playback head, during the write operation, are therefore translated in frequency. The output of the playback head is applied to an amplifier 14 and the amplified signals are coupled to a balanced modulator 15. That modulator also receives an input from a voltage controlled oscillator 16. The frequency of oscillator 16 is controlled by a signal devised from the print-out mechanism to cause the oscillator to be continuously varied over a selected frequency range in consonance with the shifting of the drum. That is, as the position of the drum is shifted relative to the stylus, the frequency of oscillator 16 is concurrently changed so that by the time the drum has been completely shifted the oscillator has been swept through the selected range. The change in frequency of the voltage controlled oscillator is very gradual and permits the stylus to make about 100 revolutions per inch of axial drum movement during the frequency sweep. Thus, the change in frequency of the oscillator that occurs during one revolution of the stylus is quite small.

The lower sideband output of the balanced modulator contains those frequencies that are the difference between the frequency of the voltage controlled oscillator and the frequencies of the signals obtained from the playback amplifier. Because the frequency of the voltage controlled oscillator is continuously changed as the oscillator sweeps through its range, the effect is to shift the difference between each frequency in the playback signal $f_{sig}$ and the oscillator frequency $f_{vco}$. For example, assuming the playback signal $f_{sig}$ has a frequency component of 20 kHz. and the voltage controlled oscillator sweeps from 555 kHz. to 455 kHz., the difference frequency, which initially is 535 kHz., is swept from 535 to 435 kHz. When the oscillator's frequency is 475 kHz., the difference frequency is 455 kHz. The effect of the frequency sweep of the voltage controlled oscillator is to cause the lower side band to be progressively shifted along the frequency axis.

The output of the balanced modulator is applied to a filter 17 having a bandwidth that is extremely narrow compared to the frequency band occupied by the translated signals obtained from the playback head. For example, the translated signals in the lower sideband may extend over a band of 100 kHz., whereas the band of the filter may be 200 cycles wide. To provide versatility, filters having bandwidths of 500 cycles or 1500 cycles may also be provided to allow the operator to select the filter bandwidth that is best for his purpose. The mean frequency of filter 17 is, for example, 455 kHz. and that filter acts as a fixed narrow window for viewing the output of modulator 15. The frequency sweep of the voltage controlled oscillator causes the output of the modulator to sweep by the window. The amplitude of the signal transmitted through the filter 17 is directly related to the amplitude of that portion of the modulator's output that is within the bandwidth of the filter. At each rotation of the memory disk, a different portion of the modulator's output is brought within the bandwidth of the filter. That is, the lower sideband of the modulator's output is, effectively, slowly drawn past the narrow spectral window presented by the filter.

Figure 9A:
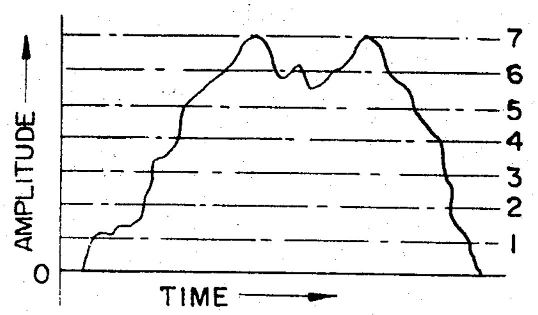
Figure 9B:
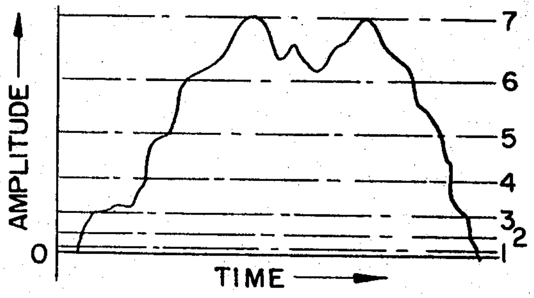
Figure 9C:
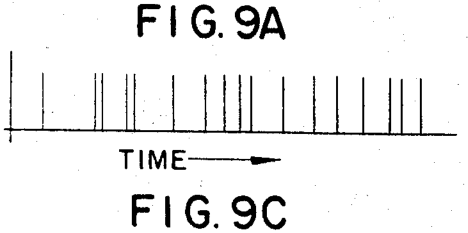
Figure 9D:
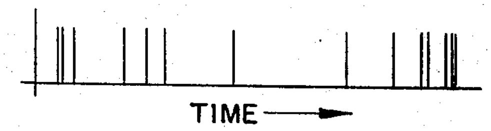

The output of filter 17 is passed into a demodulator 18 to obtain a "video" signal whose variations correspond to the amplitude envelope of the filter's output. The video output output of the demodulator is quantized by an analog to digital converter 19 whose output is applied to a contour generator 20. The contour generator is a switching matrix which emits a pulse whenever the analog signal from demodulator 18 reaches any one of a number of discrete amplitude levels. A selector 21 permits those discrete amplitude levels to be linearly or logarithmically related. In FIG. 9A, for example, seven amplitude levels are indicated by the horizontal broken lines. The contour generator emits a pulse, as indicated in FIG. 9B, whenever the video signal is at any one of those seven levels. In FIG. 9A, the amplitude levels are indicated to be linearly spaced. Because logarithmically related contours may be more desirable, the contour levels can be logarithmically spaced as indicated in FIG. 9C. As shown in FIG. 9D, the sequence of pulse emitted by the contour generator is, of course, different, because of the time at which the video signal reaches the logarithmically related levels. It is obvious that the amplitude levels can be set in any relationship that is wanted and need not be restricted to linear or logarithmic relations. The machine may have any desired number of discrete amplitude levels at which contour generator 20 emits a pulse. For each discrete amplitude level at which a pulse is emitted, a contour line is produced upon the chart. A large number of discrete amplitude levels results in crowding together of the contour lines and in some applications it may be desirable to eliminate some of the contour lines. The contour level inhibit control 22 permits any of the contour lines to be eliminated by preventing contour generator 20 from emitting a pulse when the analog signal reaches a specific amplitude level. For example, inhibit control 22 can be set to prevent the contour generator from emitting pulses when the analog signal in FIG. 9A passes through the third and fifth levels. Thus, the apparatus which normally provides seven contour levels on the chart, now indicates only five contour levels.

The analog output of demodulator 18 and the pulse output of the contour generator are applied as inputs to a video shaper 23. The video shaper converts the input signals to signals suitable for application to the stylus driver 24. That is, the shades produced upon the electrosensitive paper depend upon the amplitude of the voltage applied to the styluls. The shading characteristic of the paper is not, however, linearly related to the voltage applied to the stylus. The signals from the demodulator 18 and the contour generator pulses must, to preserve fidelity, be matched to the characteristic of the electrosensitive paper. The video shaper changes the shape of its input signals to produce the proper shading upon the paper.

Referring now to FIG. 4, the electrosensitive paper 25 is wrapped around drum 26 in a manner forming a seam 27 where the ends of the paper abut. To more securely retain the paper upon the drum, the ends of the paper may be clamped against the drum by a spline. In order that the spline shall not protrude above the surface of the drum, the drum may be provided with a groove which receives the spline so that the surface of the spline forms a continuation of the drum's cylindrical surface. Drum 26 is supported upon a standard 28 which permits the drum to move axially; that is, the drum is able to move up and down upon the standard 28. The drum does not rotate while a chart is being produced by the stylus 10, but is moved translationally upon the standard by a threaded sleeve 29 which is in engagement with a lead screw 30.

Stylus 10 is fixed to a ring gear 31 that surrounds and is concentric with the drum. Rotation of ring gear 31 causes the stylus to move around the drum in a fixed circular path. Ring gear 31 is driven by a gear 32 and the ring gear, in turn, drives a gear 33 which carries a pin 34. Gears 31, 32 and 33 are the same diameter and have the same number of teeth so that each rotation of the drive gear causes the driven gear to make one turn. Pin 34 interrupts the beam between a source of illumination 35 and a photocell 36 once during each rotation of gear 31. Gear 33 can be eliminated and pin 34 can be carried by either gear 31 or gear 32, if desired. Because the drum does not rotate during writing of the chart, seam 27 remains angularly fixed and, consequently, the position of pin 34 relative to the light beam is related to the position of stylus 10 relative to the seam.

The power for rotating the stylus and for causing the drum to move translationally during the "write" operation is provided by a servo motor 37. When clutch 38 is engaged, the servo motor is coupled to gear 32 and drives ring gear 31 through gear 32. During the "write" operation, clutch 39 is also engaged to cause the servo motor to drive lead screw 30 through a train of gears comprised by gears 40 to 44. The gearing is arranged to cause the lead screw to move the drum upward a short distance while the stylus makes one revolution around the drum. The path traced out upon the paper by the stylus is, therefore, a tightly coiled helix.

The servo motor directly drives magnetic memory disk 1 upon which the message to be analyzed has been recorded. The record head 2 is connected to the output of mixer 8 which receives its inputs from amplifier 7 and bias oscillator 6. Erase head 3 is connected to oscillator 6 which supplies the excitation for erasing the signals on the memory disk. Playback head 4 has its output delivered to a stylus control generator 45. A record switch 46 is provided upon a control panel 47 to control the application of signals to the record head. Upon actuation of switch 46, amplifier 7 and oscillator 6 are brought into operation and emit signals to the mixer and to the erase head. A speed selector 48 is provided on the control panel to permit messages of various lengths to be recorded upon the memory disk. The speed selector controls the speed of rotation of the memory disk by governing the speed of the servo motor.

A reference disk 49 is directly driven by the servo motor and consequently rotates in synchronism with the memory disk. A signal having 5000 cycles is magnetically recorded around the periphery of the reference disk and a transducer 50 is positioned to "read" the recorded reference signals. Thus for each complete revolution of the reference disk, the transducer emits a signal having 5000 cycles. While memory disk 1 and reference disk 49 are depicted as separate devices, it is obvious that two signal tracks on a single disk may be employed in their stead. Signals from transducer 50 are transmitted to amplifier 53 in motor control system 51 and that amplifier emits a pulse for each cycle "read" from the reference disk. The pulses are passed into a discriminator 54 whose output is coupled to a comparator 56. The pulse discriminator 54 emits a D.C. signal which is a function of the speed of rotation of the reference disk and, therefore, of the speed of the servo motor. The output of the discriminator is compared with a D.C. signal from a source 52. The magnitude of the D.C. signal from source 52 is controlled by the speed selector 48 in panel 47 and the magnitude of that signal determines the speed of the servo motor. Comparator 56 emits an error signal to motor amplifier 57 which causes that amplifier to increase or decrease the power applied to the servo motor to meet the speed called for by the speed selector. Motor amplifier 57 is energized from the control panel whenever record switch 46, playback switch 58, analyze switch 59, or write switch 60 are actuated and the motor amplifier is de-energized by actuation of stop switch 61.

Figure 5:
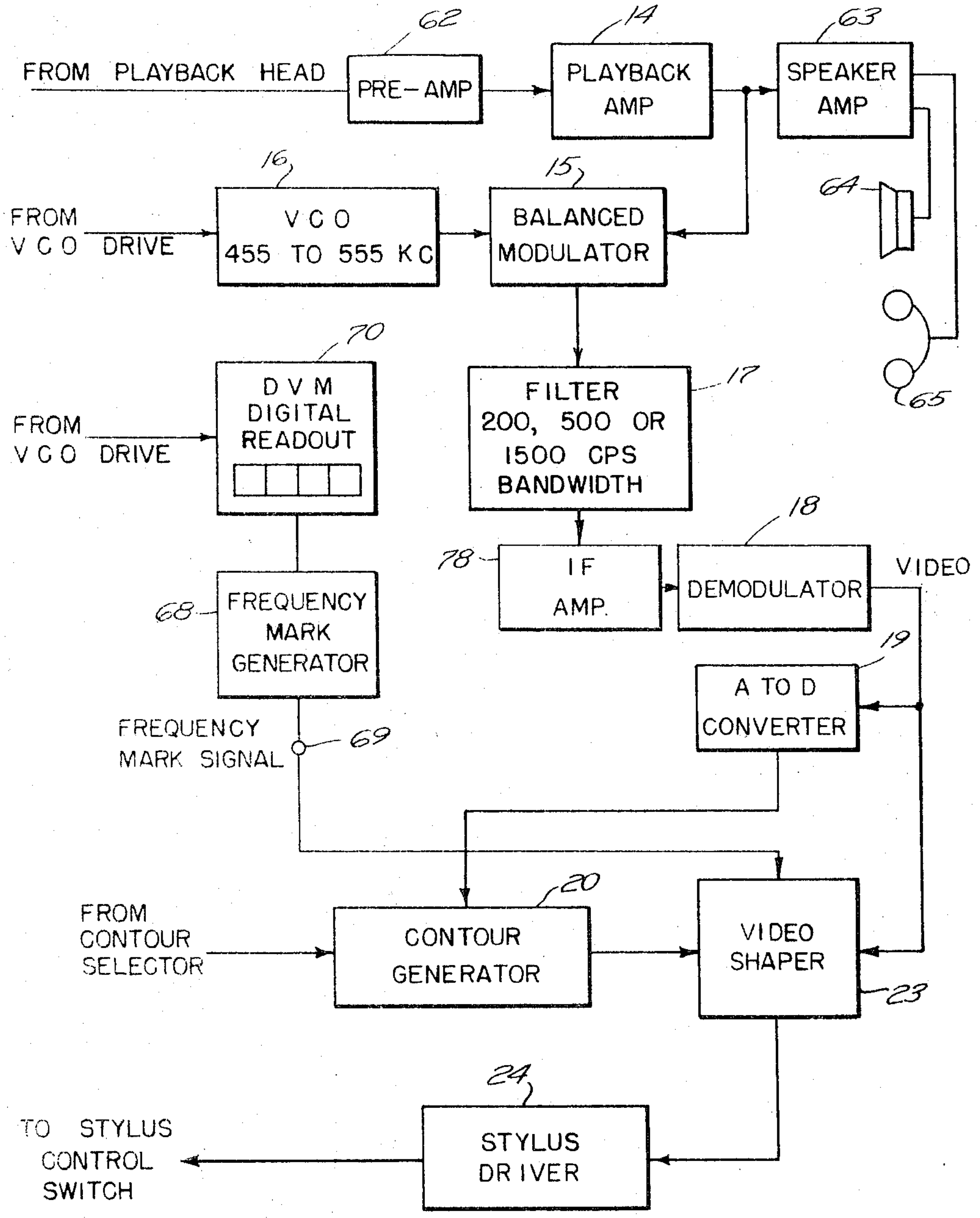
FIG. 5 shows the components included within the stylus control generator of FIG. 4.

After the message is recorded upon the memory disk, playback switch 58 in the control panel is actuated. The memory disk then is driven at the same speed at which the recording was made, but the record and erase heads are now unenergized and the signals on the memory disk are read by the playback head 4. The output of the playback head, as indicated in FIG. 5 is impressed, through a pre-amplifier 62, upon playback amplifier 14. The output of the playback amplifier is coupled into a speaker amplifier 63 which drives a speaker 64 or energizes a pair of phones 65. The operator is able to determine, upon playback, whether the message has been properly recorded.

Actuation of playback switch 58 (FIG. 4) also initiates operation of a synchronizing circuit 66 which brings about an adjustment in the position of stylus 10 to cause it to pass over the seam 27 at the time the blank portion of the memory disk is being read by the playback head. After the position of the stylus is appropriately adjusted, the stylus and the memory disk are caused to rotate in synchronism. Subsequently, the analyze switch 59 is actuated to place the apparatus in a mode which permits it to be programmed. Upon actuation of analyze switch 59, the speed selector causes source 52 in the motor control system to emit a signal to comparator circuit 56 which increases the speed of the memory disk and the stylus by a factor of five. That increase in speed results in an upward translation of the frequencies in the recorded message. During the analyze mode, the appropriate bandwidth for filter 17 is selected, the contour selector 21 is set to provide either logarithmic or linear spacing of the contour levels and the contour level control 22 is set to suppress undesired contour lines. While in the analyze mode, the video signal derived from the playback head 4 is monitored to ascertain its highest level and the gain of playback amplifier 14 is adjusted to insure that the signal does not exceed the amplitude of the highest level contour line.

The voltage controlled oscillator is capable of being swept over a range extending from 555 to 455 kHz. during the production of a frequency spectrum chart. However, the control voltage applied to oscillator 16 can be regulated during the analyze mode to cause the oscillator to sweep across a selected part of that range. For example, the control voltage may cause the oscillator to sweep from 555 to 505 kHz. during the generation of the chart. The control voltage for oscillator 16 is obtained from the wiper of a potentiometer in the voltage control oscillator drive unit 67 depicted in FIG. 4. By changing the voltage impressed upon the potentiometer, the frequency sweep of oscillator 16 is changed. Because the range over which the oscillator 16 sweeps can be selected, it is highly desirable to have frequency markers on the chart to indicate the range of frequencies that are included on the chart. A frequency mark generator 68 is shown in FIG. 5 which emits marker signals at terminal 69. When those signals are impressed upon stylus 10, they cause the stylus to mark lines across the chart, as indicated by the frequency markers in FIG. 3. The frequency mark generator is controlled by a digital voltmeter 70. The output voltage of the VCO drive 67 (FIG. 4) is applied to voltmeter 70 and to oscillator 16. As the voltage from the VCO drive controls the frequency of oscillator 16, the voltmeter 70 can be calibrated to read frequency. At particular frequencies, the voltmeter causes generator 68 to emit a marking signal. For example, the generator may emit marking signals at 500 Hz. intervals. For versatility, the output of frequency mark generator 68 may be gated to cause the marking signals to appear at 1000 Hz. intervals or less often, depending upon the range over which oscillator 16 is permitted to sweep during generation of the spectrum analysis chart.

Before commencing generation of the chart, the drum is positioned to have the stylus near the top of the electrosensitive paper. To permit the drum to be rapidly brought into that position, a fast up-down motor 71 (FIG. 4) is provided which drives the lead screw 30 through gears 72, 73, and 74. When the drum approaches the top or bottom of its travel, whether driven by servo motor 37 or fast motor 71, the sleeve 29 trips a switch which cuts off the motor and causes brakes 75 and 97 to be applied, thereby preventing the drum from overrunning the permissible limit of travel.

After the apparatus has been programmed and with the drum in the appropriate initial position, the write switch 60 is actuated to cause the spectrum analysis chart to be produced. During the "write" phase, the memory disk rotates at five times the speed at which the message was recorded and the message is repetitively read by playback head 4 (FIGS. 1 and 2). Actuation of "write switch 60 (FIG. 4) applies a signal to the stylus control switch 76 which places that switch in a condition permitting signals from the stylus control generator 45 to be transmitted to the stylus. For reasons that appear later clutch 77 is in engagement only in the playback mode during synchronization and is, therefore, disengaged during the record, analyze, and write modes. Upon actuation of the write switch, a signal is emitted to relay 55 which causes solenoid 39A to be energized. Solenoid 39A controls clutch 39 and upon being energized, that solenoid causes clutch 39 to engage. Engagement of clutch 39 causes the drum to be slowly raised as sleeve 29 progresses up the lead screw 30 while the stylus circles the slowly moving drum.

The signals produced in playback head 4 during each rotation of the memory disk are applied to stylus control generator 45. The components which make up the stylus control generator are shown in FIG. 5, excluding the speaker amplifier 63, the speaker 64 and phones 65. The signals from the playback head, after being amplified in pre-amplifier 62 and playback amplifier 14 are impressed upon balanced modulator 15. The output from the slowly sweeping oscillator 16 is also applied to the balanced modulator. The modulator's output is applied as the input to filter 17 which constitutes a narrow frequency window. The output of filter 17 is applied to an IF amplifier 78 which provides the input for demodulator 18. The output of demodulator 18, shown as waveform 79 in FIG. 1, is termed the "video" signal. The video signal is applied to the analog to digital converter 19 and to the shaper 23 which provides the output for stylus driver 24. The signals emitted by the stylus driver are, when switch 76 (FIG. 4) is in the appropriate condition, applied to the stylus and cause that stylus to write upon the electrosensitive paper 25. As indicated in FIG. 1, the output of stylus driver 24 is composite signal 80 which has a shaped video component for causing the stylus to shade the chart and has a contour pulse component. The contour pulses are of an amplitude that causes the stylus to be energized at full intensity and mark the paper with its darkest shade. The contour lines are thereby readily distinguished from the shades due to the video component.

The video signal from demodulator 18 is quantized by the apparatus shown in FIG. 6. A pulse generator 81 is employed as a clock which drives the binary counter 82. The periodic pulses emitted by the clock cause the counter to repetitively count through a sequence of binary numbers. For example, where the binary counter has six stages, the counter counts from 0 to 63 and then, on the next pulse from the clock returns to 0 to begin the sequence again. On each sixty-fourth clock pulse, the counter overflows and returns to 0. When the counter overflows it transmits a triggering signal to flip-flop 83 which causes that flip-flop to change state. That is, regardless of which of the two stable states the flip-flop is in initially, the flip-flop changes to its other stable state. Flip-flop therefore changes its state whenever the counter completes its sequence.

The stages of binary counter 82 are connected in parallel to a digital to analog converter 84 which emits an analog signal to crossover detectors 85 and 86. Because converter 84 converts the digital output of counter 82 to an equivalent voltage value, the voltage value increases by one unit for each unit increase of the count in the counter. The analog signal emitted by converter 84 is, therefore, a voltage having sixty-four steps, as indicated in FIG. 7. That stepped voltage waveform is repetitively emitted by the converter because the counter continues to repeat its sequence in response to the pulses continually emitted by the clock. Compared to fluctuations in the video signal, each staircase waveform is of short duration. That is, because the staircase waveform is generated very rapidly, the video signal can, during the existence of one staircase waveform, be considered to change very slowly.

The video signal and the staircase waveform are applied as inputs to crossover detector 85. When the amplitude of the staircase waveform from converter 84 exceeds the amplitude of the video signal by one step or less, detector 85 emits a pulse signal to switch 87. The staircase waveform from converter 84 is simultaneously applied to crossover detector 86 which receives the video signal after it has been increased in strength by amplifier 88. Because of amplifier 88 the video signal applied to detector 86 is eight times greater than the video signal applied to detector 85. Crossover detector 86 emits a pulse signal to switch 87 when the staircase waveform equals or exceeds the video signal.

Switch 87 is controlled by flip-flop 83. When the flip-flop is in one stable state, it couples the output of detector 85 to AND gate 89; when the flip-flop is in its other stable state, it couples the output of detector 86 to the AND gate. The switch prevents both detectors from being coupled to the AND gate at the same time. Because flip-flop 83 changes from one state to another each time counter 82 completes a sequence of counts, switch 87 alternately connects one crossover detector and then the other to the AND gate. Where detector 85 is coupled to the AND gate for the duration of one staircase waveform, then detector 86 is coupled to the AND gate during the occurrence of the next staircase waveform. As the staircase waveforms are generated in rapid succession, the detectors are alternately connected by switch 87 to the AND gate.

AND gate 89 has one of its inputs connected to logic matrix 90. The logic matrix may be a conventional switching matrix which receives its inputs from the normal and complementary outputs of the stages in binary counter 82. In addition the switching matrix receives an input from flip-flop 83 which, for convenience, is designated the N input. The N input can be either a binary ONE or a binary ZERO, depending upon the state of flip-flop 83. The flip-flop, when in the state which causes switch 87 to couple detector 86 to AND gate 89, emits a binary ZERO. As a corollary, when detector 85 is coupled by the switch to the AND gate, the flip-flop is in the state where the N output is a binary ONE.

Logic matrix 90 is arranged to emit an energizing input to AND gate 89 whenever the count in binary counter 82 reaches a value which has been selected as one of the contour levels. The logic matrix may be in two sections, one of which is used when the contour levels that are employed are logarithmically related and the other section of the matrix being used when the contour levels that are used are linearly related. The section of the matrix that is employed is chosen through contour selector 21 (FIG. 1) which provides an enabling signal to the section of the logic matrix that is selected. Where a linear relationship is selected, the logic matrix, for example, may emit an energizing input to the AND gate 89 when the count reaches 8, 16, 24, 32, 40, etc. That is, a count of 8 in the binary counter determines the first contour level, the count of 16 in the binary counter determines the second contour level, the count of 24 determines the third contour level, and so on. In the absence of an energizing signal from the logic matrix, AND gate 89 is inhibited. AND gate 89 emits an output pulse to shaper 23 (FIG. 1) only when both its inputs are simultaneously energized. That is, AND gate 89 emits a signal only if a pulse from detector 85 or detector 86 is applied to the input of the AND gate while an energizing signal is being emitted by the logic matrix.

Amplifier 88 (FIG. 6) effectively causes an expansion of the lower region of the staircase waveform shown in FIG. 7. A video signal from the demodulator which falls within the low range is, in crossover detector 85 compared with not more than the first eight steps of the waveform. After being amplified eightfold by amplifier 88, the video signal is compared in detector 86 against a maximum of 64 steps. The amplifier 88 therefore provides a factor of eight scale expansion for low level signals from the demodulator 18 (FIG. 1). For low level signals, both detectors 85 and 86 emit pulses during the existence of the same staircase waveform. The pulse from detector 85 or detector 86 will pass through switch 87, depending upon the state of flip-flop 83. Because of the N signal emitted by the flip-flop to the logic matrix, AND gate 89 will be inhibited if the pulse from detector 85 passes through the switch; if the pulses that pass through the gate are from detector 86, the AND gate will be enabled by an energizing signal from the logic matrix if the count in the counter is at one of the contour values. That is, for low level video signals, only pulses from detector 86 can cause an output from the AND gate.

Where the "normal" video signal is above the low range indicated in FIG. 7, then the amplified video signal, whose level has been increased eightfold, is above the highest step in the staircase waveform. The staircase waveform, in that situation, never attains the amplitude of the amplified video signal and detector 86 does not then emit a pulse. Hence, for "normal" video signals that are above the low range, only detector 85 is able to emit a pulse.

FIG. 8 tabulates logarithmically related contour levels with respect to the decimal value of the count in counter 82 and the value of the signal N emitted by flip-flop 83. In the FIG. 8 table, it is assumed that the counter uses the standard binary code. The stages of the counter are indicated under the columns headed $2^0$, $2^1$, $2^2$ . . . $2^5$, and the output of a stage is indicated as being either a binary ONE or a binary ZERO. The N signal indicates whether the normal or the expanded scale is used. When N is a binary ZERO, the expanded scale is used; when N is a binary ONE, the normal scale is used. The first contour level, for example, is determined by a count of eight when the expanded scale is used. The fourth contour level is also determined by a count of eight when the normal scale is used. When the counter reaches a count of eight, the $2^3$ stage of the counter emits a binary ONE signal while all the other stages emit binary ZERO signals. The logic matrix, in response to that output of the counter emits an energizing signal to AND gate 89 (FIG. 6). If during that energizing signal, a pulse is emitted by detector 85 and is transmitted through the switch 87 to AND gate 89, the video signal is at the fourth contour level. If during that energizing signal instead of a pulse from detector 85, a pulse is emitted by detector 86 and is transmitted through switch 87 to AND gate 89, then the video signal is at the first contour level. It is necessary to be able to distinguish between a pulse signifying the fourth amplitude level and a pulse signifying the first amplitude level where it is required that the apparatus be capable of suppressing any desired contour. The N signal from flip-flop 83 provides a convenient means of distinguishing between those amplitude levels.

An electrical circuit suitable for use as a crossover detector is depicted in FIG. 10. The circuit utilizes a tunnel diode TD1 that is in series with a resistor $R_s$. The tunnel diode is connected by resistor $R_2$ to a terminal 91 at which a voltage $-V_{cc}$ is impressed. The tunnel diode is connected between the base and emitter of transistor Q1 and the tunnel diode thereby shunts the input to the transistor. For expository purposes, the transistor Q1 is indicated to be of the NPN type and its collector is coupled by resistor R1 to a terminal 92 at which a positive voltage $+V_{cc}$ is impressed. The staircase waveform, derived from the analog to digital converter (FIG. 6), is applied at terminal 93. The emitter of the transistor is connected to terminal 94 at which the video signal is impressed.

The characteristic curve appearing in FIG. 11 depicts the manner in which the current flow through the tunnel diode varies with the voltage impressed across the diode. Current is plotted along the ordinate and voltage is plotted along the abscissa. The series resistor $R_s$ determines the load line 95 which intersects the characteristic curve at points *a* and *b*. The high conductance state of the diode occurs when the voltage impressed across the tunnel diode is $V_a$; the low conductance state of the diode occurs at the voltage $V_b$.

Assuming the video signal $E_s$ applied at terminal 94 to be an essentially unvarying signal in relation to the rapidly changing staircase waveform $E_L$, the tunnel diode is reversely biased when the amplitude of $E_L$ is less than the $E_s$ amplitude. The tunnel diode, when reversely biased, is in its non-conductive state. Because transistor Q1 is also reversely biased by those signals, the transistor is cut-off and the voltage appearing at output terminal 96 is $+V_{cc}$. As the staircase amplitude rises and becomes greater than $E_s$ but less than $V_a$, the current flow $I_d$ through the tunnel diode is much greater than the current $I_b$ flowing in the base of the transistor. When the amplitude of $E_L$ rises and reaches $V_a$, the tunnel diode very rapidly switches from its high conductance state to its low conductance state. In the low conductance state of the tunnel diode, the base current $I_b$ of the transistor exceeds the diode current $I_d$. Because the change from high conduction to low conduction occurs very rapidly in the tunnel diode, transistor Q1 is suddenly brought into conduction, causing the output voltage $E_o$ at terminal 96 to drop abruptly. Thereafter as the amplitude of the staircase continues to increase, the tunnel diode acts as a conventional diode. The circuit is reset very rapidly when the staircase waveform drops abruptly at the end of the counter's sequence.

The synchronizing circuit 66 of FIG. 4 is shown in more detail in FIG. 12. The purpose of the synchronization circuit is to bring about an adjustment in the position of stylus 10 (FIG. 4) to cause that stylus to pass over the seam 27 at the time the blank portion of the memory disk is read by the playback head. By synchronizing, it is here meant the bringing of two rotating bodies into a desired angular relationship. This is accomplished by synchronizing the rotation of ring gear 31, upon which the stylus is carried, with the rotation of memory disk 1 to cause the end of the message on that disk to be at the playback head 4 just as the stylus reaches the leading edge of the seam. The stylus will then cross the seam while the blank portion of the recording track of disk 1 is scanned by the playback head.

In the record mode, clutches 38, 39, and 77 are all disengaged. Upon termination of the record mode, the end of the message is at the erase head. When entering the playback mode, the position of the end of the message is known. The initial position of the stylus however is not known when entering the playback mode and the position of the stylus is first ascertained when pin 34 intercepts the light beamed toward photocell 36. Upon commencement of the playback mode, signals derived from the 5000 cycles recorded upon the reference disk are emitted as a train of pulses by the amplifier 53 in the motor control system 51. Those pulses are termed "sync" pulses. Because the reference disk 49 is on the same shaft as memory disk 1, precisely 5000 pulses are emitted from amplifier 53 for each rotation of the memory disk.

Upon actuation of the playback switch 58 (FIG. 4) on the control panel, a signal is emitted to switch 100 in FIG. 12 which causes that switch to apply the D.C. voltage at terminal 101 to clutch relay 102. Switch 100 is of the self-latching type and continues to apply the D.C. voltage to clutch relay 102 until switch receives an unlatching signal. Clutch relay 102 applies the D.C. voltage to one or the other of two solenoids 38A or 77A, depending upon whether the clutch relay is latched or unlatched. Solenoid 38A controls the operation of clutch 38 (FIG. 4) and when that clutch is engaged stylus 10 is driven together with memory disk 1. Solenoid 77A controls the operation of clutch 77 (FIG. 4) and when clutch 77 is engaged the stylus is driven, through a train of gears, at one half the rotational rate of the memory disk. Clutch relay 102 is arranged, when unlatched, to apply the D.C. voltage to solenoid 77A to cause clutch 77 to engage. Upon being latched, relay 102 transfers the D.C. voltage to solenoid 38A, whereupon clutch 38 engages and clutch 77 disengages. At the start of the playback mode, relay 102 is unlatched, having been placed in that condition during the record mode. The signal from the playback switch which causes switch 100 to apply D.C. voltage to relay 102, therefore, results in energization of solenoid 77A and engagement of clutch 77. Consequently, when the playback switch is actuated, stylus 10 is driven at one half the rotational rate of the memory disk.

Clutch relay 102 is coupled to a counter 103 which, upon counting 10,000 pulses, emits a signal that causes relay 102 to latch. The pulse input to the counter is obtained from a switch 104 that has two positions. In one position, switch 104 couples all the sync pulses applied at terminal 105 to the counter 103; in the other position, switch 104 couples the output of flip-flop 106 is at one half the rate of the pulses impressed at terminal 105. When switch 104 is in the unlatched condition, it connects only terminal 105 to the input of counter 103 and when switch 104 is latched, it connects only the output of the flip-flop to the input of counter 103. During the record mode, a signal is applied to switch 104 to unlatch that device and the counter 103 is reset to zero.

At the start of the playback mode, all the sync pulses are applied to the input of counter 103, while the stylus rotates at one half the rate of the memory disk. When pin 34 (FIG. 4) interrupts the light beamed to photocell 36, that photocell emits a signal to ampifier 107 (FIG. 12) that causes switch 104 to latch. Switch 104, being of the self-latching type remains in that state until it receives an unlatching signal. Upon being latched, switch 104 permits the pulses emitted from flip-flop 106 to be applied to the counter. The counter which formerly was counting the pulses at their full rate, upon latching of switch 104 counts the pulses at one half their full rate. Upon counting 10,000 pulses, counter 103 emits a signal which latches clutch relay 102. The clutch relay thereupon transfers the D.C. voltage to solenoid 38A which causes engagement of clutch 38 and disengagement of clutch 77. At the engagement of clutch 38, stylus 10 rotates at the same rate as the memory disk and the stylus passes over the seam when the blank portion of the recording track passes by the playback head.

The operation of the synchronizing circuit can be better understood with aid of FIGS. 13, 14, and 15 which show corresponding positions of pin gear 33 and the memory disk 1 during successive steps in that operation. In those figures all angles are given in radians. At the conclusion of the record mode the end of the message recorded on the memory disk is at the erase head 3. The end of the message is, for expository purposes, indicated by the dot M1 in the figures. The pin 34, carried on gear 33, may, at the beginning of the playback mode, be anywhere relative to the position of photocell 36 and a position for that pin has been arbitrarily chosen in FIG. 13. At the initiation of playback, pin 34 is at the angle $\theta$ with respect to the reference line and the photocell 36 is fixed at the angle $\phi$ with respect to the reference line. At the same time, the end of the message M1 on the memory disk is at the angle $\eta$ with respect to the same reference line. Gear 33 at the beginning of playback rotates at ½ the rotational rate of the memory disk and all the sync pulses, derived from the reference disk, are applied to the input of the counter (FIG. 12). When, as indicated in FIG. 14, pin 34 comes into alignment with the photocell, the signal emitted by the photocell causes the pulses applied to the counter to be at ½ the full sync pulse rate. At the time the counter begins the ½ rate count, pin 34 has moved through an angle $2\pi-\theta+\phi$ relative to its initial position while the end of the message M1 has moved through twice that angle, viz $2[2\pi-\theta+\phi]$. When the pulse count in the counter reaches 10,000, pin 34, as indicated in FIG. 15, has moved through an additional angle $2(\theta-\phi)$ and the memory disk has rotated through an additional angle $4(\theta-\phi)$. At the 10,000 count, the counter causes gear 33 and memory disk 1 to be coupled together in a manner causing them to rotate in synchronism. Thereafter, pin 34 rotates into alignment with the photocell at the same time that the end of the message comes into alignment with the erase head.

FIG. 16 tabulates the position of pin 34, the position of the end of the message M1, and the count in the counter at the times depicted in FIGS. 13, 14, and 15. The position of the end of the message M1 is $4\pi+\eta+2\theta-2\phi$, when synchronization is achieved. As the $4\pi$ term means the end of the message has made two full revolutions (viz $4\pi=720°$), that term may be ignored and the position of M1 relative to the reference line at synchronization is $\eta+2\theta-2\phi$. The position of pin 34 relative to the reference line at synchronization is $2\theta-\phi$. If then, the angular position of pin 34 at synchronization is subtracted from the angular position of M1 at synchronization, viz, $\eta+2\theta-2\phi-(2\theta-\phi)=\alpha$, the result gives the angular relation $\alpha$ between the pin and M1 and that result is $\alpha=\eta-\phi$. That is, the angular difference between pin 34 and the end of the message M1 when synchronization is achieved, is the angle $\alpha$. Further, as $\theta$ does not appear in the equation, the angle $\alpha$ is shown to be independent of the starting position of pin 34. The angle $\alpha$ is determined only by the initial position of M1 and the position of photocell 36 relative to the reference line. The position of stylus 10 is related to the position of the pin 34 so that adjustment of the position of pin 34 relative to the position of the end of the message M1, in effect, also adjusts the position of the stylus. Indeed, the stylus and the pin can be carried upon the same gear, if desired. Further, the position of the playback head 4 is fixed relative to erase head 3, as indicated in FIG. 15. Because those relationships are known, the stylus is made to pass over the seam at the time the end of the message reaches playback head 4. The synchronizing system computes when the memory disk, which is rotating twice as fast as the pin gear, has overtaken that gear by sufficient angular rotation to cause the end of the message to be situated in the correct angular position relative to the stylus and when that correct relative position is achieved, locks the memory disk to the pin gear to cause them to rotate together.

Although the pin gear has, for expository reasons, been described as being driven at one half the rotational rate of the memory disk, other ratios of rotation may be employed to attain the same result. If other ratios are used, the reduced rate at which the pulses are fed into the counter upon command of the photocell signal must also be altered. Thus, where $n$ is the ratio of the rotational rate of the faster member relative to the slower member, then the reduced rate, $u$, at which pulses are fed to the counter upon command of the photocell signal becomes $$u=\frac{n-1}{n}$$

For example, where the faster member rotates at four times the rate of the slower member, the ratio $n=4$ and $$u=\frac{3}{4}$$

Thus, when the signal from the photocell is received, the pulses are applied to the counter at three fourths of full sync pulse rate.

In view of the multitude of ways in which the invention can be embodied, it is not intended that the scope of the invention be restricted to the precise apparatus illustrated in the drawings or described in the exposition. Rather it is intended that the scope of the invention be delimited by the claims appended hereto and that within that scope be included only those structures which in essence utilize the invention.

What is claimed is:

1. Apparatus for determining when two rotating members have attained an angular relationship, comprising a counter for providing an output signal when the two rotating members have attained the angular relationship, means for deriving sync signals upon rotation of the first member, each sync signal indicating an equal increment of rotation of the first member, means for ascertaining an initial position of the first member and thereupon causing the sync pulses to be applied to the counter at their full rate, the second member having an index thereon, a stationary sensor for providing a signal when the index of the second member rotates into alignment with the sensor, means for causing the second member to rotate at a fraction of the rotational rate of the first member, means responsive to the signal from the sensor for causing the sync pulses to be applied to the counter at a fraction of the full sync signal rate, and the counter providing an output signal upon attaining a predetermined count.

2. Apparatus as in claim 1, wherein the fractional rate of rotation of the second member is one half the rotational rate of the first member, the fraction of the sync pulses applied to the counter upon emission of a signal from the sensor is one half the full pulse rate, and the predetermined count of the counter is at least twice the number of sync pulses derived from one revolution of the first member.

3. Apparatus as in claim 1 wherein the means for deriving sync signals upon rotation of the first member includes a magnetic disc having signals recorded at equal intervals around its periphery and a magnetic transducer for sensing the recorded signals.

4. Apparatus as in claim 3, further including means responsive to the output signal from the counter for causing the two members to rotate in synchronism.

References Cited

UNITED STATES PATENTS

| | | | |
|---|---|---|---|
| 3,122,735 | 2/1964 | Townsend | 340—347 |
| 3,139,613 | 6/1964 | De Negri | 340—347 |
| 3,178,562 | 4/1965 | Acker. | |
| 3,266,034 | 8/1966 | Spiegel | 235—92 X |

MAYNARD R. WILBUR, *Primary Examiner.*

G. J. MAIER, *Assistant Examiner.*

U.S. Cl. X.R.

340—268